Patented Apr. 20, 1954

2,675,853

UNITED STATES PATENT OFFICE 2,675,853

FABRICATION OF SYNTHETIC
FLUORINE-MICAS

Robert A. Hatch and Jay E. Comeforo,
Norris, Tenn.

No Drawing. Application June 9, 1952,
Serial No. 292,594

8 Claims. (Cl. 154—2.6)

(Granted under Title 35, U. S. Code (1952),
sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to synthetic mica and more particularly to fabricated synthetic mica articles and to a method for fabricating these articles without the use of binders or other foreign substances.

Mica refers to a family of chemically and structurally related inorganic crystalline compounds having the general formula $$X_{\frac{1}{2} \text{ to } 1} Y_{2 \text{ to } 3} Z_4 O_{10}(OH,F)_2$$

where X refers to large univalent or divalent cations having ionic radii greater than about 1 a. u., each cation in the structure being surrounded by 12 oxygen anions as nearest neighbors (so-called 12-fold coordination or $X-O_{12}$). The X position usually is occupied by potassium ($K^+$) in most natural micas but in synthetics it may be replaced by sodium ($Na^+$), rubidium ($Rb^+$), thallium ($Tl^+$), cesium ($Cs^+$), calcium ($Ca^{++}$), strontium ($Sr^{++}$), barium ($Ba^{++}$), and lead ($Pb^{++}$).

Y refers to intermediate-sized cations (0.6 to 0.9 a. u.) in 6-fold coordination ($Y-O_6$). The most abundant and commercially important mica in nature is the variety muscovite

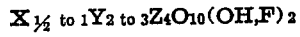
$(KAl_2AlSi_3O_{10}(OH)_2)$ in which aluminum ($Al^{+++}$) cations occupy the Y position. Another important variety is phlogopite ($KMg_3AlSi_3(OH)_2$) in which magnesium ($Mg^{++}$) cations occupy the Y position. The mica structure is much more stable with divalent cations occupying the 3 available Y positions, consequently a number of such cations can replace magnesium completely in the synthetic fluor-phlogopite structure, such as iron ($Fe^{++}$), cobalt ($Co^{++}$), and nickel ($Ni^{++}$), or partially replace magnesium, such as manganese ($Mn^{++}$), lithium ($Li^+$), titanium ($Ti^{++}$), zinc ($Zn^{++}$), and copper ($Cu^{++}$).

Z refers to small and/or highly charged cations in 4-fold coordination with oxygen ($Z-O_4$). In most types of mica the 4 Z positions are occupied by 3 silicon ($Si^{++++}$) cations and 1 aluminum ($Al^{+++}$), trisilicic micas. However, tetrasilicic (4 silicon) types and disilicic (2 silicon plus 2 alumina) types are known. In some types of fluor-phlogopite the silicon can be replaced completely with germanium ($Ge^{++++}$), in most types the aluminum cation can be replaced with an equivalent amount of beryllium ($Be^{++}$), boron ($B^{+++}$), iron ($Fe^{+++}$), manganese ($Mn^{+++}$), vanadium ($V^{+++}$), chromium ($Cr^{+++}$), and gallium ($Ga^{+++}$).

$O^=$ refers to the oxygen anion, $OH^-$ to the hydroxyl anion commonly present in most natural micas, and $F^-$ refers to fluorine which completely replaces OH in the synthetic mica products described in this invention.

As in all silicate structures, the basic unit (building block) of the mica structure is the $(Si,Al)O_4$ or $Z-O_4$ tetrahedron. These are linked together along the base to form a hexagonal network sheet, the oxygen anion at the apices of the pyramids all pointing in the same direction. The hydroxyl or fluorine anions fit into the hexagonal holes outlined by the apex oxygens. The simplest structure preserving the composition of mica contains two such sheets bonded together with the Y position cations in 6-fold coordination. Successive double layers are bonded together with the large X position cation which fit snugly into hexagonal holes outlined by the bases of the $(Si,Al)O_4$ linked tetrahedra.

It has long been known that flakes of mica, either natural or synthetic, can be fabricated to form a larger sheet by using a binder such as shellac, varnish, sodium silicate, and the like and subjecting the bonded mica to heat and pressure. However, the presence of these binders has a deleterious effect on the heat resistance, electrical properties, and chemical stability of the sheet formed.

A recent process has been developed whereby a fabricated mica sheet can be produced without the use of other materials as binders. The prime requisites for making the fabricated mica sheet by this process are (1) the surface of the mica splittings must be virgin, (2) the splittings must not be contaminated, and (3) the mica when split must be very thin, preferably to a thickness of $1/10,000$ of an inch or less. However, the fabricated sheet thus formed disintegrates readily in water unless it is impregnated with a suitable binder.

Accordingly, an object of this invention is to provide a method for producing a water-resistant laminated mica article in which mica alone is the binding agent.

Another object of this invention is to provide a method of fabricating synthetic mica flakes into a sheet or block with mica alone as the binding agent without the necessity of virgin, uncontaminated surfaces and extremely thin flakes.

A further object of this invention is to produce a laminated water-resistant mica article of improved heat resistance, superior dielectric properties, and greater chemical stability than laminated mica articles now available.

Other objects and advantages of the invention will appear from the following description.

According to this invention, the improved mica article is produced by bonding together two or more synthetic micas having different melting points. Thin flakes of a high melting synthetic mica may be bonded by a lower melting synthetic mica introduced in flake or powder form. Thus, the material is composed virtually of 100 per cent synthetic mica and does not contain foreign substances as binders. The bond between the two kinds of micas is produced by heating the material to a temperature close to the melting temperature of the lower melting mica while simultaneously applying pressure to the material. This temperature may range from a temperature below the melting point of the lower melting mica to a temperature above the melting point of this mica, and the expression "close to" as used herein is inclusive to the entire permissible temperature range. A permanent bond between the two kinds of micas results from the chemical reaction and recrystallization of the lower-melting mica in contact with the higher melting flakes. The chemical bond is the result of a tendency for a solid solution, intermediate in composition between the two micas, to form at the interfaces.

This invention is applicable to the use of any combination of synthetic mica compositions that are thermally stable at temperatures near their melting point and possess a difference in melting temperature. Natural micas or other micas containing water of constitution are unsuitable since they are unstable at the temperatures employed. A large number of synthetic mica compositions of varying properties and melting temperatures and suitable for the purposes of this invention may be prepared by isomorphic replacement of ions in the mica structure.

Mica compositions that can be prepared in this manner are the synthetic fluorine micas. The so-called "normal" fluorine phlogopite mica, of a composition corresponding to the formula $KMg_3AlSi_3O_{10}F_2$, is a mica of this type. This material may be prepared by melting materials such as $K_2SiF_6$, $K_2CO_3$, MgO, $Al_2O_3$ and $SiO_2$ or others providing the necessary components, in the proportions indicated by the formula under conditions minimizing volatilization of the fluorides, and then crystallizing the mica from the melt by slow cooling. Fluoride-micas of this type crystallize readily from a melt of similar composition.

Synthetic micas of different melting points may be produced by substituting other ions into the phlogopite structure on the basis of well-known crystal-chemical laws. For example, the potassium ion of $KMg_3AlSi_3O_{10}F_2$ can be completely replaced with sodium, rubidium, thallium, cesium, calcium, strontium, barium, and lead. The magnesium can be replaced completely with ferrous iron, cobalt, and nickel; by about two-thirds with divalent manganese; by about one-third with lithium and divalent titanium; and about one-sixth with zinc and copper. The aluminum can be replaced with beryllium, boron, ferric iron, trivalent manganese, vanadium, silicon, and in part with chromium. The silicon can be completely replaced with germanium. Other ions may be silver, cadmium, lanthanum, neodymium, tetravalent titanium, scandium, gallium, columbium, and chlorine. The greatest majority of these compositions exhibit lower melting temperatures than the fluorine-mica of the formula $KMg_3AlSi_3O_{10}F_2$.

Examples of several of the many substituted synthetic, fluorine-micas are those of composition corresponding to the formulas

and

It is readily apparent that the fluorine-mica family is inclusive of an extensive series of compounds obtainable by substitution of other ions in the phlogopite structure. Thus, the composition of the fabricated mica article of this invention can be varied over a wide range by combining different low and high melting micas and by varying the proportions of the micas of different chemical composition. By this means a high degree of latitude and control of the various properties of the finished product is possible.

Flakes of synthetic fluor-mica, prepared, for example, by crystallization from melts as described above, are formed into a laminated synthetic mica-product by hot-pressing, using finely ground synthetic mica of a lower softening temperature to consolidate the product into a dense, water-resistant, laminated mica product. The flakes may be of from thumbnail size to minus 200 mesh. The mica having the lower softening temperature may be ground much finer than the higher melting flakes. It may be mixed with the other mica flakes in a paper making machine, or by any other suitable means as it is not necessary to take special care of the mica surfaces. Two or more different micas may be simply dry mixed and then hot-pressed to form the desired laminated mica product. The proportion of the higher to lower melting micas may be varied from about 99 to 1 down to about 1 to 1. The lower melting mica can be added in the form of a flake, a fine-powder, or in the form of a glass of mica composition that devitrifies to form mica upon the subsequent heat treatment. The hot-pressing temperature used is dependent upon the pressure applied, the compositions of the micas used, and the concentration of the low-melting micas.

The invention is further illustrated but not limited by the following example of practice.

*Example*

Seven parts by weight of a fluor-phlogopite mica of the composition $KMg_3AlSi_3O_{10}F_2$ having a mesh size of from minus 4 to plus 20 mesh are dry mixed with three parts by weight of a boron-containing synthetic mica of the composition $KMg_3BSi_3O_{10}F_2$ having a mesh size of minus 200 mesh. The boron-containing mica in this example is the lower softening temperature mica. A pressure of about 700 pounds per square inch is applied to the admixture and the material is fabricated under this pressure and at a temperature of about 1250° C. into a strong, water-resistant laminated mica product.

Much higher pressures may be employed with a corresponding lowering of the temperature necessary for bonding. For example, with the materials of the composition in the proportions specified in above example, the temperature required for bonding may be reduced by several hundred degrees centigrade by use of a pressure of the order of 10,000 pounds per square inch. The requisite bonding temperatures may be readily ascertained for the particular admixture of micas and for the pressure to be employed.

Since the synthetic micas, for example the fluorine-micas, are more stable thermally than natural mica, the fabricated synthetic mica product can be used at temperatures 200–300° C. higher than any natural mica product however fabricated. The method of bonding of this invention preserves the markedly superior heat resistance of the synthetic micas which would otherwise be lost if the usual binders, such as silicons, oils, resins and the like, were used. The method of bonding also preserves the superior dielectric properties, especially the power factor, of synthetic fluorine-micas. The laminated product of this invention is substantially pure synthetic mica, and as such has excellent chemical resistance as well as being resistant to water and to weathering. The new laminated synthetic mica is flexible and can be punched, stamped, or otherwise machined as there are no binding agents to interfere with such operations.

It will be appreciated from a reading of the foregoing specification that the invention herein described is susceptible of various changes and modifications without departing from the spirit and scope thereof.

What is claimed is:

1. The method of forming a laminated mica article comprising mixing a plurality of synthetic fluor-micas having different melting points and selected from the group having the composition

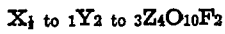

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with a cation selected from $Mn^{++}$, $Li^+$, $Ti^{++}$, $Zn^{++}$, and $Cu^{++}$, Z is selected from the group consisting of $Si^{++++}$, $Ge^{++++}$, and a combination of $Si^{++++}$ with a cation selected from $Al^{+++}$, $Be^{++}$, $B^{+++}$, $Fe^{+++}$, $Mn^{+++}$, $V^{+++}$, and $Cr^{+++}$, O is oxygen, and F is fluorine, and hot-pressing the resulting mixture.

2. The method of forming a laminated mica article comprising mixing particles of a plurality of synthetic fluor-micas of different melting points and selected from the group having the composition

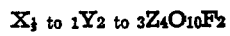

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with a cation selected from $Mn^{++}$, $Li^+$, $Ti^{++}$, $Zn^{++}$, and $Cu^{++}$, Z is selected from the group consisting of $Si^{++++}$, $Ge^{++++}$, and a combination of $Si^{++++}$ with a cation selected from $Al^{+++}$, $Be^{++}$, $B^{+++}$, $Fe^{+++}$, $Mn^{+++}$, $V^{+++}$, and $Cr^{+++}$, O is oxygen, and F is fluorine, and subjecting said admixture to a temperature and pressure at which the lower melting fluor-mica softens and forms a bond between the particles of the higher-melting mica.

3. The method of forming a laminated mica article comprising mixing thin flakes of a high-melting fluor-mica selected from the group having the composition

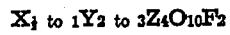

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with a cation selected from $Mn^{++}$, $Li^+$, $Ti^{++}$, $Zn^{++}$, and $Cu^{++}$, Z is selected from the group consisting of $Si^{++++}$, $Ge^{++++}$, and a combination of $Si^{++++}$ with a cation selected from $Al^{+++}$, $Be^{++}$, $B^{+++}$, $Fe^{+++}$, $Mn^{+++}$, $V^{+++}$, and $Cr^{+++}$, O is oxygen, and F is fluorine with finely divided particles of a lower-melting fluor-mica selected from the same group in proportions in the range of from about ninety-nine to one to about one to one and hot-pressing the admixture at a temperature close to the melting temperature of the lower melting fluor-mica.

4. The method of forming a laminated mica article comprising mixing about seven parts by weight of minus 4 plus 20 mesh fluor-phlogopite mica of the composition of $KMg_3AlSi_3O_{10}F_2$ with about three parts of a minus 100 mesh boron-containing synthetic mica of the composition $KMg_3BSi_3O_{10}F_2$, and subjecting the admixture to a temperature of about 1250° C. and a pressure of about 700 pounds per square inch.

5. A laminated mica article comprising thin flakes of a synthetic fluor-mica bonded by synthetic fluor-mica of a lower melting point said micas being selected from the group having the composition

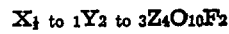

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with a cation selected from $Mn^{++}$, $Li^+$, $Ti^{++}$, $Zn^{++}$, and $Cu^{++}$, Z is selected from the group consisting of $Si^{++++}$, $Ge^{++++}$, and a combination of $Si^{++++}$ with a cation selected from $Al^{+++}$, $Be^{++}$, $B^{+++}$, $Fe^{+++}$, $Mn^{+++}$, $V^{+++}$, and $Cr^{+++}$, O is oxygen, and F is fluorine.

6. The method of forming a mica article comprising subjecting a particulate mixture of fluor-phlogopite micas possessing different melting points and selected from the group having the composition

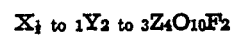

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with a cation selected from $Mn^{++}$, $Li^+$, $Ti^{++}$, $Zn^{++}$, and $Cu^{++}$, Z is selected from the group consisting of $Si^{++++}$, $Ge^{++++}$, and a combination of $Si^{++++}$ with a cation selected from $Al^{+++}$, $Be^{++}$, $B^{+++}$, $Fe^{+++}$, $Mn^{+++}$, $V^{+++}$, and $Cr^{+++}$, O is oxygen, and F is fluorine, to a temperature and pressure at which a bond is formed between said micas by reaction at the interfaces of said particles.

7. The method of forming a mica article comprising subjecting a particulate mixture of fluor-phlogopite mica of the composition

and a fluor-phlogopite mica of different chemical composition and different melting point selected from the group having the composition

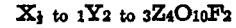

wherein X is selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is selected from the group consisting of $Mg^{++}$, $Fe^{++}$, $Co^{++}$, $Ni^{++}$, and a combination of $Mg^{++}$ with a cation selected from $Mn^{++}$, $Li^+$, $Ti^{++}$, $Zn^{++}$, and $Cu^{++}$, Z is selected from the group consisting of Si++++, Ge++++, and a combination of Si++++ with a cation selected from Al+++, Be++, B+++, Fe+++, Mn+++, V+++, and Cr+++, O is oxygen, and F is fluorine, to a temperature and pressure at which a bond is formed between said micas by reaction at the interfaces of said particles.

8. A mica article comprising particles of a fluor-phlogopite mica selected from the group having the composition $$X_{\frac{1}{2} \text{ to } 1} Y_{2 \text{ to } 3} Z_4 O_{10} F_2$$

wherein X is selected from the group consisting of K+, Na+, Rb+, Tl+, Cs+, Ca++, Sr++, Ba++, and Pb++, Y is selected from the group consisting of Mg++, Fe++, Co++, Ni++, and a combination of Mg++ with a cation selected from Mn++, Li+, Ti++, Zn++, and Cu++, Z is selected from the group consisting of Si++++, Ge++++, and a combination of Si++++ with a cation selected from Al+++, Be++, B+++, Fe+++, Mn+++, V+++, and Cr+++, O is oxygen, and F is fluorine, chemically and physically bonded together by reaction with particles of a fluor-phlogopite mica also selected from said group but of a different chemical composition to form a solid solution of intermediate composition between said mica particles.

References Cited in the file of this patent

UNITED STATES PATENTS

| Number | Name | Date |
| --- | --- | --- |
| 1,123,985 | Bolling | Jan. 5, 1915 |
| 1,320,509 | Swett | Nov. 4, 1919 |
| 1,812,306 | Russ | June 30, 1931 |
| 1,834,880 | Twells | Dec. 1, 1931 |
| 1,925,341 | Russell | Sept. 5, 1933 |
| 2,032,239 | Wedlock | Feb. 25, 1936 |
| 2,136,877 | DelPech et al. | Nov. 15, 1938 |
| 2,185,280 | Stuckardt et al. | Jan. 2, 1940 |
| 2,196,972 | Boughton et al. | Apr. 16, 1940 |
| 2,516,983 | Hatch | Aug. 1, 1950 |

FOREIGN PATENTS

| Number | Country | Date |
| --- | --- | --- |
| 367,537 | Germany | Jan. 22, 1923 |